UNITED STATES PATENT OFFICE.

EMIL B. KINZ, OF OAK PARK, AND EDSON C. WESCOTT, OF SACRAMENTO, CALIFORNIA, ASSIGNORS TO PACIFIC GAS AND ELECTRIC COMPANY, OF SAN FRANCISCO, CALIFORNIA, A CORPORATION OF CALIFORNIA.

METHOD OF REVIVIFYING AND UTILIZING SPENT OXID.

1,211,713.     Specification of Letters Patent.     Patented Jan. 9, 1917.

No Drawing.     Application filed May 27, 1916. Serial No. 100,368.

*To all whom it may concern:*

Be it known that we, EMIL B. KINZ and EDSON C. WESCOTT, citizens of the United States, and residing, respectively, at Oak Park and Sacramento, in the county of Sacramento and State of California, have invented new and useful Improvements in Methods of Revivifying and Utilizing Spent Oxid, of which the following is a specification.

The present invention relates to a method of revivifying and utilizing spent oxid.

Spent oxid is the substance remaining from the use of oxid of iron for the purpose of extracting the sulfur from gas in gas works. When so saturated with sulfur that it can no longer be used for this purpose, it is known as spent oxid, a waste commodity in gas works.

The object of the present invention is to so extract the sulfur from the spent oxid as to obtain therefrom a useful commodity and at the same time restore the spent oxid to its original condition so that it can be used over again.

In practising our invention, we add to, and mix intimately with, the spent oxid a sufficient quantity of unslaked lime. We then subject the mixture to the action of steam, which has the effect of highly heating the mixture, not only by the transference of the sensible and latent heats of the steam, but also by the slaking of the lime, so that the lime readily combines with the sulfur in the spent oxid and extracts it therefrom, whereby a strong solution of a compound of lime and sulfur is obtained. This solution is drained off from the oxid which is left in a revivified condition, substantially free from sulfur, so that it can be used over again. The solution of the compound of lime and sulfur is concentrated by evaporation, so as to form a commercial article, which can, when greatly diluted, be used for spraying fruit and other trees.

The word "water" is, in the first claim, used in its broad sense to signify the combination of hydrogen and oxygen in their combining proportions, whether gaseous or liquid, and its meaning is not intended to be restricted to such combination in a liquid form.

We claim:—

1. The method of revivifying and utilizing spent oxid from gas works which consists in adding thereto unslaked lime and sufficiently hot water in a fluid form to extract the sulfur therefrom and separating from the oxid a soluble compound of lime and sulfur.

2. The method of revivifying and utilizing spent oxid from gas works which consists in adding thereto unslaked lime and steam to extract the sulfur therefrom and separating from the oxid a soluble compound of lime and sulfur.

EMIL B. KINZ.
EDSON C. WESCOTT.

Copies of this patent may be obtained for five cents each, by addressing the "Commissioner of Patents, Washington, D. C."